Patented Dec. 6, 1949

2,490,282

UNITED STATES PATENT OFFICE 2,490,282

COUPLING OF AROMATIC HYDROXY COMPOUNDS

Frank H. Seubold, Jr., Frederick F. Rust, and William E. Vaughan, Berkeley, Calif., assignors to Shell Development Company, San Francisco, Calif., a corporation of Delaware No Drawing. Application August 31, 1948, Serial No. 47,154

5 Claims. (Cl. 260—619)

This invention relates to a process for coupling aromatic hydroxy compounds such as phenols, naphthols and polyhydric aromatic compounds. More particularly, the invention provides a process for forming carbon-to-carbon bonds between molecules of aromatic hydroxy compounds substantially without oxidizing the hydroxyl groups.

Numerous polynuclear aromatic hydroxy compounds have been synthesized or have been isolated from naturally occurring compositions. The polynuclear aromatic hydroxy compounds have proven to be of great value in the inhibition of oxidation, in the developing of photographs and in a wide variety of applications.

Heretofore the synthesis of polynuclear aromatic hydroxy compounds has required a series of individual reaction steps. Since the work of Hofmann in 1878 it has been known that when certain aromatic hydroxy compounds react with an oxidizing agent a coupling reaction may occur resulting in the formation of carbon-to-carbon bonds between the molecules and a concurrent oxidation of the hydroxyl groups to carbonyl groups, i. e., the conversion of a phenol to a biphenoquinone. In spite of the value of the polynuclear aromatic hydroxy compounds, methods of forming them by processes other than the reduction of the biphenoquinones obtainable by the oxidative-coupling of phenols have heretofore involved an even more extensive series of reactions. For example, U. S. Patents 2,260,739 and 2,285,563 disclose the prepartion of binuclear aromatic hydroxy compounds by converting mononuclear hydroxy compounds to an ether by alkylation, converting the ether to an iodo derivative by the action of iodine and mercuric oxide, coupling the substituted-ether molecules by splitting out iodine with copper and hydrolyzing the binuclear ether to form the hydroxy compound. U. S. Patent 2,229,010 discloses the preparation of certain alkenyl derivatives of biphenohydroquinone by forming a dialkenyl ether of the disodium salt of biphenohydroquinone, and subsequently heating the ether to rearrange it to a nuclear dialkenyl-biphenohydroquinone containing a single alkenyl radical on each phenyl ring.

An object of the present invention is to provide a process for the direct conversion of aromatic hydroxy compounds to polynuclear aromatic hydroxy compounds. Another object is to provide a novel reaction between an aromatic hydroxy compound and a compound of the class described below, which reaction results in the formation of carbon-to-carbon bonds between molecules of the hydroxy compound substantially in the absence of oxidation of the hydroxyl groups. Still other objects and advantages will be apparent from the following description of the invention.

In many cases, the reactions of compounds containing a peroxy group (—O—O—) are characterized by the chemical changes initiated by the decomposition of the peroxy group. Various reactions between aromatic compounds and compounds containing peroxy groups have been investigated. For example, Goldhammer, Biochem. Z. 189 81–87 (1927), reports that phenol reacts with hydrogen peroxide in the presence of ferric sulfate to produce oxidation products, principally pyrocatechol and purpurogallin. Ono and Oyamada, Bull. Chem. Soc. Jap. 11 132–7 (1936), report that ortho-cresol reacts with hydrogen peroxide in the presence of ferrous sulfate to produce oxidation products, principally para-toluhydroquinone. Boeskin and Engelbertz, Prac. Acad. Sci. Amstd. 34 1292 (1931), report that in a reaction between phenol and a compound in which the peroxy group is attached to an organic radical, peroxyacetic acid, a cleavage of the ring occurred to produce oxidation products, principally cis,cis-muconic acid.

We have disovered that when an aromatic hydroxy compound reacts with a compound which contains a peroxy group and which forms among its initial decomposition products hydrocarbyloxy free radicals, i. e., free radicals of the structure RO— where R is a monovalent hydrocarbon radical, substantially no oxidation occurs and the aromatic hydroxy compound is directly converted to a polynuclear aromatic hydroxy compound. The process provided by the present invention may therefore be described as bringing about a reaction between an aromatic hydroxy compound containing at least one hydroxyl group attached to a carbon atom in the ring, and an organic peroxide in which at least one hydrocarbyl radical is attached to the peroxy group, by creating a mixture of them at the decomposition temperature of the peroxide.

Aromatic hydroxy compounds which are suitable for employment in the present process include, phenol and its homologs, such as:

The cresols
The xylols
2-methyl-6-tertiary-butylphenol
2-amyl-4-isopropylphenol
2-butyl-6-cyclohexylphenol
(3 - methyl-2-hydroxyphenyl) cyclohexylmethane
2-butyl-6-decylphenol
2-methyl-4-cyclohexenylphenol
2-propyl-4-vinylphenol
2-butyl-6-propargylphenol
3-tetradecylphenol the naphthols and their homologs, such as:

1-decyl-2-hydroxynaphthalene
   1-hydroxy-2-tertiary-amylnaphthalene
   1-hydroxy-3-hexenyl-naphthalene
   1-cyclohexyl-2-hydroxynaphthalene and the polyhydric aromatic hydroxy compounds, such as:

Resorcinol
   Pyrogallol
   Biphenohydroquinone
   Naphthylhydroquinone

Phenol and its alkyl homologs (which compounds are referred to by the terms "phenols" or "a phenol") containing not more than about 20 carbon atoms are a preferred group of reactants for employment in the process of the invention. When it is desired to produce a compound exhibiting particularly strong reducing power, the dialkylphenols of not more than 20 carbon atoms are especially suitable and particularly good conversions to individual binuclear aromatic hydroxy compounds are obtained from the 2,6-dialkyl isomers.

Organic peroxides which are suitable for employment in the present process are those which when thermally decomposed produce hydrocarbyloxy free radicals among their initial decomposition products. Organic peroxides in which at least one of the radicals attached to the peroxy group is a hydrocarbyl radical comprise a generally suitable class of peroxide reactants. Illustrative examples of suitable peroxide reactants include the dihydrocarbyl peroxides and their analogs in which one hydrocarbyl radical contains polar substituents, such as:

Di-tertiary-amyl peroxide
   Chloro-di-tertiary-butyl peroxide
   Diethyl peroxide
   Diamyl peroxide
   Dicyclohexyl peroxide
   Allyl tertiary-butyl peroxide
   Cumyl tertiary-butyl peroxide
   Isopropyl tertiary-butyl peroxide dihydrocarbylperoxylalkanes and their analogs in which the alkane residue or one hydrocarbyl peroxy radical contains polar substituents, such as:

2,2-bis(tertiary-butylperoxy) butane
2-methylperoxy-2-tertiary-butylperoxy-propane
2,2-bis(chloro-tertiary-butylperoxy) pentane
Phenyl-bis(tertiary-butylperoxy) methane
2,2-bis(tertiary-butylperoxy) - 3 - chloro-propane and hydrocarbyl peresters, such as:

Tertiary-butyl perbenzoate
   Tertiary-butyl perlaurate
   Di-tertiary-butyldipermalonate
   Ethyl perbenzoate "Unsubstituted organic peroxides" in which at least one tertiary-alkyl radical is attached to the peroxy group, such as di-tertiary butyl peroxide, 2,2 - bis(tertiary-butylperoxy) butane, and tertiary-butyl perbenzoate are particularly preferred reactants, and the di-tertiary-alkyl peroxides such as di-tertiary-butyl peroxide are especially suitable for employment in the present process. The term "unsubstituted organic peroxides" is employed to mean peroxides in which the peroxy group is linked solely to hydrocarbyl or hydrocarboyl radicals (radicals of the formula RC(O)— where R is a hydrocarbyl radical).

The temperature at which the coupling reaction is conducted may be varied over wide limits by the choice of suitable peroxides, but temperatures from 0° C. to about 200° C. are generally preferable. In general, the reaction proceeds more rapidly at elevated temperatures, and the temperature range of from about 100° C. to 150° C. has been found particularly suitable for the process of the invention. As the reaction is dependent upon the aromatic hydroxy compound being contacted with free radicals, to conduct the reaction at any given temperature it is necessary to employ a peroxide which decomposes at about that temperature. The decomposition temperature (the recommended temperature ranges for their use) of organic peroxides are determinable properties and are in many cases known to the art. For example, U. S. Patent No. 2,379,218 describes numerous suitable organic peroxides and the recommended temperature ranges for their use, including:

|  | °C. |
|---|---|
| Diethyl percarbonate | 45 to 70 |
| Allyl percarbonate | 50 to 80 |
| Methyl n-amyl ketone peroxide | 110 to 135 |
| Methyl isobutyl ketone peroxide | 110 to 135 |
| Ethyl peroxide | 125 to 145 |
| Methyl isobutyl peroxide | 130 to 150 |
| Dicyclohexyl peroxide | 150 |

The decomposition temperature of typical peroxides of the particularly preferred class include:

|  | °C. |
|---|---|
| Di-tertiary-butyl diperoxalate | 0 to 40 |
| Di-tertiary-butyl dipermalonate | 20 to 60 |
| Tertiary-butyl perbenzoate | 75 to 115 |
| 2,2-bis(tertiary-butylperoxy) butane | 80 to 120 |
| Di-tertiary-butyl peroxide | 100 to 150 |

The process of the invention may be conducted in substantially any reaction vessel capable of retaining organic liquids and may be conducted in a batchwise or continuous manner. Either the aromatic hydroxy compound or the peroxide may be employed in excess in the coupling reaction. However, it is generally more economical to employ an excess of the hydroxy compound.

The process of the invention is preferably conducted in the liquid phase. Although substantially any desired reaction pressure may be employed, the use of a reduced pressure can provide but little advantage. Thus, except where a component of the reaction mixture is volatile at the reaction temperature, the use of atmospheric pressure is preferred. Where it is desired to employ as a component of the reaction mixture a compound which is normally volatile at the temperature at which it is desirable to conduct the reaction, the use of superatmospheric pressure is preferred. In general, the peroxides and aromatic hydroxy compounds which are sufficiently reactive to provide high yields of product in a short reaction time at a moderate temperature are those which are normally liquid (compounds which are liquid at about 20° C. under atmospheric pressure), and the employment of such normally liquid reactants, or in general, compounds containing not more than 20 carbon atoms, is preferred. However, solid reactants may suitably be employed in the present process by conducting the reaction in amounts of an inert organic solvent (for example, a saturated aliphatic hydrocarbon such as normal heptane, or normal octane, or an aromatic hydrocarbon such as benzene or toluene) sufficient to dissolve substantial portions of each reactant in a single liquid phase.

The following examples illustrate in detail the application of the process of the invention to the coupling of particular aromatic hydroxy compounds. However, as numerous variations in the reactants and reaction conditions are within the scope of the invention, the invention is not to be construed as being limited to the particular reactants and reaction conditions recited in the examples.

Example I.—2,6-xylenol

Maintaining a solution of 0.84 mole of 2,6-xylenol and 0.17 mole of di-tertiary-butyl peroxide at a temperature of 130° C. for a period of hours couples the xylenol in accordance with the process of the invention. The occurrence of the coupling reaction is indicated by the production of only a minor amount of methane. This shows that the tertiary-butoxy free radicals into which the peroxide initially decomposes extract hydrogen atoms from the xylenol to form hydroxyaryl free radicals and tertiary-butyl alcohol. The product of the reaction can be isolated by filtration or by fractional distillation.

The formation of carbon-to-carbon bonds with a substantial absence of oxidation of the hydroxyl groups is demonstrated by the fact that 2,6-xylenol treated for 48 hours in the above manner produced a crude product melting at 210–18° C. The reported melting point of 3,3',5,5'-tetramethyl-4,4'-biphenohydroquinone is 221° C. The crude product was purified and further identified as the above compound by the following analysis:

|  | Found | | Calculated for $C_{16}H_{18}O_2$ |
|---|---|---|---|
| Acetyl value (eq./100 g.) | 0.89 | ---- | 0.83 |
| Carbonyl value (eq./100 g.) | 0 | ---- | 0 |
| Percent C | 78.8 | 78.7 | 79.3 |
| Percent H | 7.6 | 7.6 | 7.5 |

Example II.—2,4-xylenol

Maintaining a solution of 0.84 mole of 2,4-xylenol and 0.17 mole of di-tertiary-butyl peroxide at a temperature of 130° C. for a period of hours couples the xylenol in accordance with the process of the invention. The production of only a minor amount of methane indicates the occurrence of the coupling of the molecules. The product is readily removed from the reaction mixture by filtration or by fractional distillation.

Example III.—Phenol

Maintaining a solution of 200 cc. of phenol and 50 cc. of di-tertiary-butyl peroxide at a temperature of between 100° C. and 110° C. for a period of hours couples phenol in accordance with the process of the invention. The occurrence of the coupling reaction is indicated by the production of only a minor amount of methane. The product of the reaction can be removed by filtration or by a fractional distillation.

The formation of carbon-to-carbon bonds between more than two molecules and between polynuclear aromatic hydroxy compounds is demonstrated by the fact that phenol treated for 40 hours in the above manner produced a glass-like amorphous solid which was shown by the following analysis to be a trimer of the formula $(C_6H_4OH)_3$,

|  | Found | | Calculated for $C_{18}H_{15}O_3$ |
|---|---|---|---|
| Percent C | 77.5 | 77.5 | 77.4 |
| Percent H | 5.2 | 5.2 | 5.2 |
| M. W. | 283 | ---- | 279 |

Example IV.—2,4-dimethyl-6-isopropylphenol

Maintaining a solution of 0.5 mole of 2,4-dimethyl-6-isopropylphenol and 0.25 mole of di-tertiary-butyl peroxide at a temperature of 135° C. for a period of hours couples the phenol in accordance with the process of the invention. The occurrence of the coupling reaction is indicated by the evolution of but a minor amount of methane. The product of the reaction can be isolated by filtration or fractional distillation.

The formation of carbon-to-carbon bonds between polyalkylated aromatic hydroxy compounds as well as aromatic hydroxy compounds containing branched side-chains is demonstrated by the fact that 2,4-dimethyl-6-isopropylphenol treated in the above manner for 7 hours produced a diphenolic dimer of the formula $(C_{11}H_{14}OH)_2$ as shown by the following analysis:

|  | Found | Calculated for $C_{22}H_{30}O_2$ |
|---|---|---|
| Acetyl value (eq./100 g.) | 0.63 | 0.61 |
| Percent C | 80.8 | 81.0 |
| Percent H | 9.1 | 9.2 |
| M. W. | 321 | 326 |

Example V.—Resorcinol

Maintaining a solution of 0.82 mole of resorcinol and 0.41 mole of di-tertiary-butyl peroxide at 130° C. for a period of hours couples resorcinol in accordance with the process of the invention. The occurrence of the coupling reaction is indicated by the production of only a minor amount of methane. The reaction product can be removed by filtration or by merely dissolving the monomeric resorcinol in water.

The formation of carbon-to-carbon bonds in the substantial absence of oxidizing hydroxyl groups even when a plurality of hydroxyl groups are present in the reactant molecules is demonstrated by the fact that resorcinol treated in the above manner for eight hours was coupled to a dimer having an acetyl value of 0.925 equivalent per 100 grams.

Example VI.—The use of a dihydrocarbylperoxyalkane

Maintaining a solution of 0.50 mole of alpha naphthol and 0.25 mole of 2,2-bis(tertiary-butylperoxy)butane at a temperature of 90° C. for a period of hours couples the naphthol in accordance with the process of the invention. The occurrence of the coupling reaction is indicated by the production of only a minor amount of methane. The reaction product can be separated from the reaction mixture by filtration or fractional distillation.

*Example VII.—The use of a hydrocarbyl perester*

Maintaining a solution of 0.50 mole of mixed cresols and 0.26 mole of tertiary-butyl perbenzoate at a temperature of 80° C. for a period of hours couples the cresols in accordance with the process of the invention. The occurrence of the coupling reaction is indicated by the production of only a minor amount of methane. The reaction product can be separated from the reaction mixture by filtration or fractional distillation.

The invention claimed is:

1. A method of coupling phenol which comprises heating phenol with di-tertiary-butyl peroxide at a temperature of from 100° C. to 150° C.

2. A method of preparing 3,3',5,5'-tetramethyl-4,4'-biphenohydroquinone which comprises heating 2,6-xylenol with di-tertiary-butyl peroxide at a temperature of from 100° C. to 150° C.

3. A process for the production of a polyphenohydroquinone which comprises heating a solution of a phenol and an unsubstituted organic peroxide containing at least one tertiary-carbon atom attached to the peroxy group, to the decomposition temperature of the peroxide.

4. A process for the production of polynuclear polyhydroxy aromatic compounds which comprises heating a mononuclear aromatic hydroxy compound containing at least one hydroxyl group attached to a carbon atom in the ring with an organic peroxide containing at least one tertiary-carbon atom attached to the peroxy group, to the decomposition temperature of the peroxide.

5. A process for coupling aromatic hydroxy compounds which comprises heating an aromatic hydroxy compound containing at least one hydroxyl group attached to a carbon atom in an aromatic ring with an organic peroxide which decomposes yielding hydrocarbyloxy free radicals among its initial decomposition products, at the decomposition temperature.

FRANK H. SEUBOLD, Jr.
FREDERICK F. RUST.
WILLIAM E. VAUGHAN.

REFERENCES CITED

The following references are of record in the file of this patent:

UNITED STATES PATENTS

| Number | Name | Date |
|---|---|---|
| 2,396,217 | Vaughan et al. | Mar. 5, 1946 |
| 2,400,041 | Dickey | May 7, 1946 |
| 2,403,709 | Dickey et al. | July 9, 1946 |
| 2,403,758 | Rust et al. | July 9, 1946 |

OTHER REFERENCES

Wieland, Berichte, vol. 54, page 2371 (1921).